(12) United States Patent
O'Connor

(10) Patent No.: US 11,066,985 B2
(45) Date of Patent: Jul. 20, 2021

(54) ROTARY ROLLER MOTOR (RRM)

(71) Applicant: Michael Francis O'Connor, Lincoln, CA (US)

(72) Inventor: Michael Francis O'Connor, Lincoln, CA (US)

( * ) Notice: Subject to any disclaimer, the term of this patent is extended or adjusted under 35 U.S.C. 154(b) by 0 days.

(21) Appl. No.: 16/501,740

(22) Filed: Jun. 3, 2019

(65) Prior Publication Data
US 2020/0378300 A1    Dec. 3, 2020

(51) Int. Cl.
*F02B 53/04* (2006.01)
*F02B 53/06* (2006.01)
*F02B 55/02* (2006.01)
*F02B 55/08* (2006.01)
*F02B 55/14* (2006.01)
*F02B 75/02* (2006.01)
*F01C 1/00* (2006.01)

(52) U.S. Cl.
CPC ............... *F02B 55/14* (2013.01); *F01C 1/00* (2013.01); *F02B 53/04* (2013.01); *F02B 53/06* (2013.01); *F02B 55/02* (2013.01); *F02B 55/08* (2013.01); *F02B 75/02* (2013.01); *F02B 2075/027* (2013.01)

(58) Field of Classification Search
CPC .......... F02B 53/02; F02B 53/04; F02B 53/06; F02B 55/00; F02B 55/02; F02B 55/08; F02B 55/14; F01C 1/00
See application file for complete search history.

(56) References Cited

U.S. PATENT DOCUMENTS

| 4,080,935 | A  | * | 3/1978  | Olson ........................ F01C 1/46 123/205 |
| 6,347,611 | B1 | * | 2/2002  | Wright ................... F01C 1/3566 123/223 |
| 2005/0045144 | A1 | * | 3/2005  | Shuba ................... F01C 1/3441 123/243 |
| 2011/0247583 | A1 | * | 10/2011 | Shkolnik ................ F02B 53/06 123/245 |
| 2016/0312691 | A1 | * | 10/2016 | Shkolnik ............... F01C 1/3446 |
| 2017/0138253 | A1 | * | 5/2017  | Monsen .................. F02B 53/14 |

* cited by examiner

*Primary Examiner* — Audrey K Bradley
(74) *Attorney, Agent, or Firm* — Jacob W Neu; Bradley Arant Boult Cummings, LLP

(57) ABSTRACT

A rotary roller motor is disclosed herein. The rotary roller motor is a four-stroke internal combustion engine, wherein the rotor "rolls" around the inside of the engine block. The rotor is a two-part rotor having an inner part with a shaft and an offset circular lobe, and an outer rotor fit around the lobe. Two barriers are provided around the rotor chamber, a compression/power barrier and an exhaust/intake barrier. The combustion chamber has a non-reversing compression barrier and a compression hold barrier regulating the combustion of gas.

1 Claim, 7 Drawing Sheets

ROTARY ROLLER MOTOR (RRM)

CROSS-REFERENCE TO OTHER APPLICATIONS

This application claims the benefit of filing of U.S. Provisional App. No. 62/763,320 filed on Jun. 7, 2018.

BACKGROUND OF THE INVENTION

Rotary engines have several potential benefits over conventional piston engines, such as efficiency and greater horsepower to weight ratios. However, one significant problem for using rotary engines is maintaining an adequate seal around the rotor's perimeter due to the 'scraping' of the seals against the bore in the engine block. This problem occurs even in 'Wankel-type' rotary engines. Other rotary designs that use slats, dual rotors, etc. have similar problems.

Another problem with many rotary engine designs is complexity. In Wankel-type engines, the rotor cavity in the engine block has a complex design requiring precise machining and internal gearing. The Wankel-type engine also limits the ability to use variable compression ratios or power strokes. Other rotary engines, such as those utilizing a rotary slat, are seemingly simple but result in a complex mass of bearings in an attempt to reduce friction or wear of the slats.

SUMMARY OF THE INVENTION

A rotary roller motor is disclosed herein. In some respects the rotary roller motor is an internal combustion engine with an offset two-part rotor that rolls around a symmetrical bore in the engine block. In other respects the rotary roller motor has a seal between the rotor and the wall of the engine block. In still other respects the rotary roller motor has an exhaust/intake barrier and a compression/power barrier to separate the four strokes of the combustion cycle during each rotation. The rotor "rolls" over these barriers as it passes by within the cycle. In still other respects, a non-reversing compression barrier and a compression hold barrier, internal to the combustion chamber, regulate the compression and combustion sequence.

DETAILED DESCRIPTION

A rotary roller motor having a four-cycle rotary internal combustion engine is described herein. In general terms, in the rotary roller motor the rotary rolls around the inside of the engine block, rather than scraping the surface.

Figure 1:
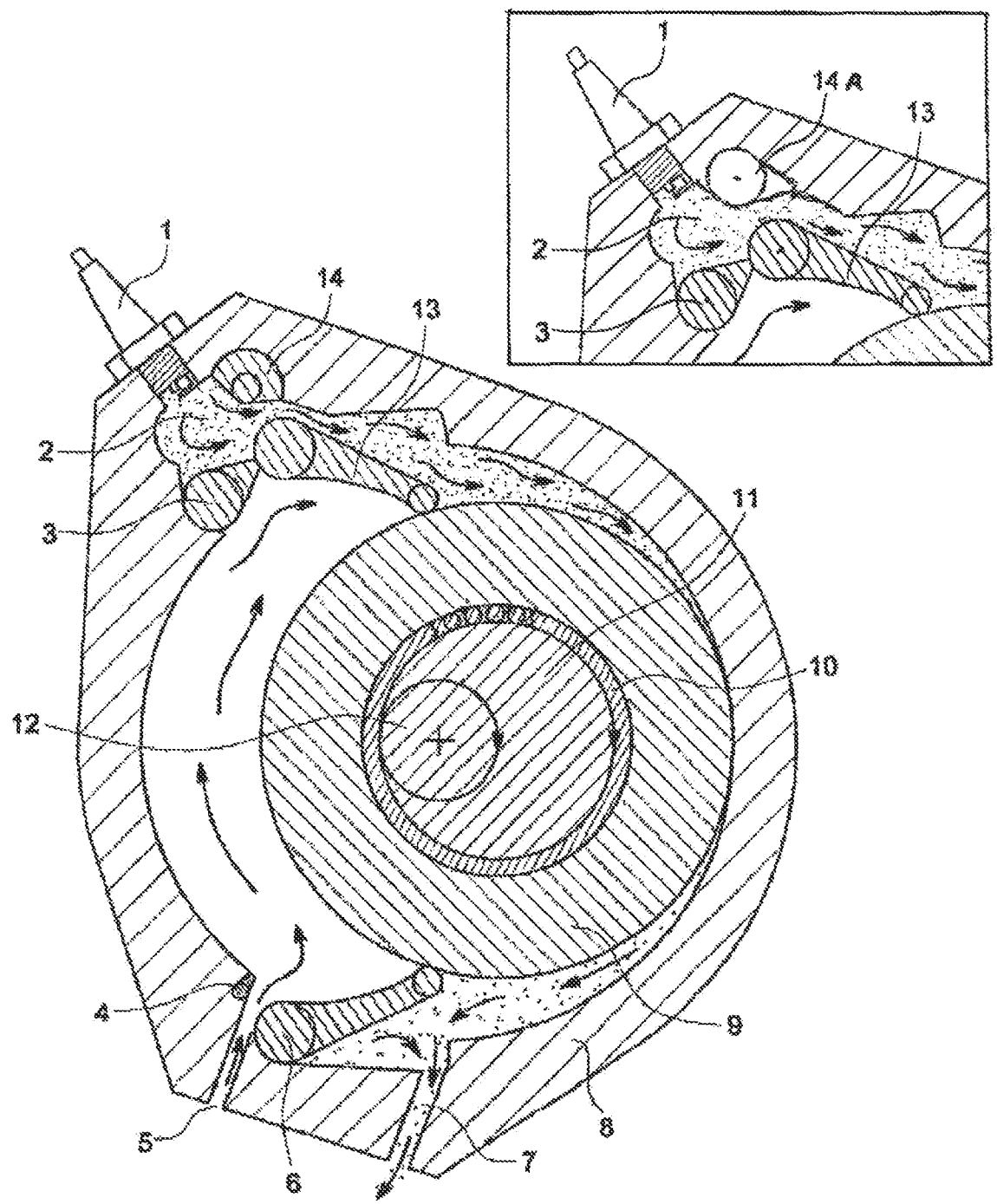
FIG. 1 depicts a longitudinal section view of a rotary roller motor after the ignition stroke in the combustion sequence, according to one embodiment of the invention.

FIG. 1 depicts an end view of a rotary roller motor as described further herein. The rotary roller motor has a rotor housed within an engine block 8. The rotor has a rotor shaft 12 with a rigidly attached offset circular lobe 11. In other embodiments the rotor shaft 12 and offset circular lobe 11 may be formed as a single integrated or machined part. An outer rotor 9 is fitted symmetrically around the offset circular lobe 11. Between the outer rotor and the offset circular lobe are inter-rotor bearings 10. The inter-rotor bearings 10 allow the outer rotor 9 to rotate freely vis-à-vis the offset circular lobe 11.

The rotor is housed within the engine block 8. The engine block 8 is cylindrical and houses the rotor in a circular interior space. The outer rotor 9 rolls around the interior surface of the engine block 8. As the outer rotor 9 rolls, it also rotates the offset circular lobe 11, causing the rotor shaft 12 to rotate in place.

As air is compressed by the advancing rotor, it is directed into one side of the combustion chamber 2 by a non-reversing compression barrier 3 and the compression/power barrier 13. Fuel is added to the air through a conventional carburetor before entering the intake port 5, or fuel may be directly injected into the combustion chamber 2, where the fuel/air mixture is ignited. A compression hold barrier 14 is also provided on the opposite side of the combustion chamber 2 from the non-reversing compression barrier 3. The operation of the compression hold barrier 14 is further described with reference to FIG. 2 below.

FIG. 1 further depicts the exhaust port 7, the intake port 5, and the exhaust/intake barrier 6 in between the two ports. The exhaust port 7 permits the combusted gases and exhaust to leave the engine block 8. The intake port 5 permits clear air to enter the engine block 8. The exhaust/intake barrier 6 keeps the exhaust gases exiting through the exhaust port 7 from the fresh air, or fuel/air mixture, entering the intake port 5 as further explained below. A non-reversing intake barrier 4 may also be provided.

The motor operates by having the rotor roll around the interior of the engine block 8 as driven by the combustion, expansion, and exhaust of gas in the combustion chamber 2. The rotor moves through 4 stages in the combustion cycle. In FIG. 1, the compression/power barrier 13 is shown in an open position to permit the expansion of gas against the trailing surface of the outer rotor 9. This urges the rotor to rotate towards the next cycle.

The exhaust/intake barrier 6 simultaneously permits both air intake into the interior and to permit gas to be exhausted out of the exhaust port 6. The exhaust/intake barrier 6 is urged against the advancing edge of the outer rotor 9, as explained with respect to FIG. 4. This action separates the clean air from the exhaust.

Figure 2:
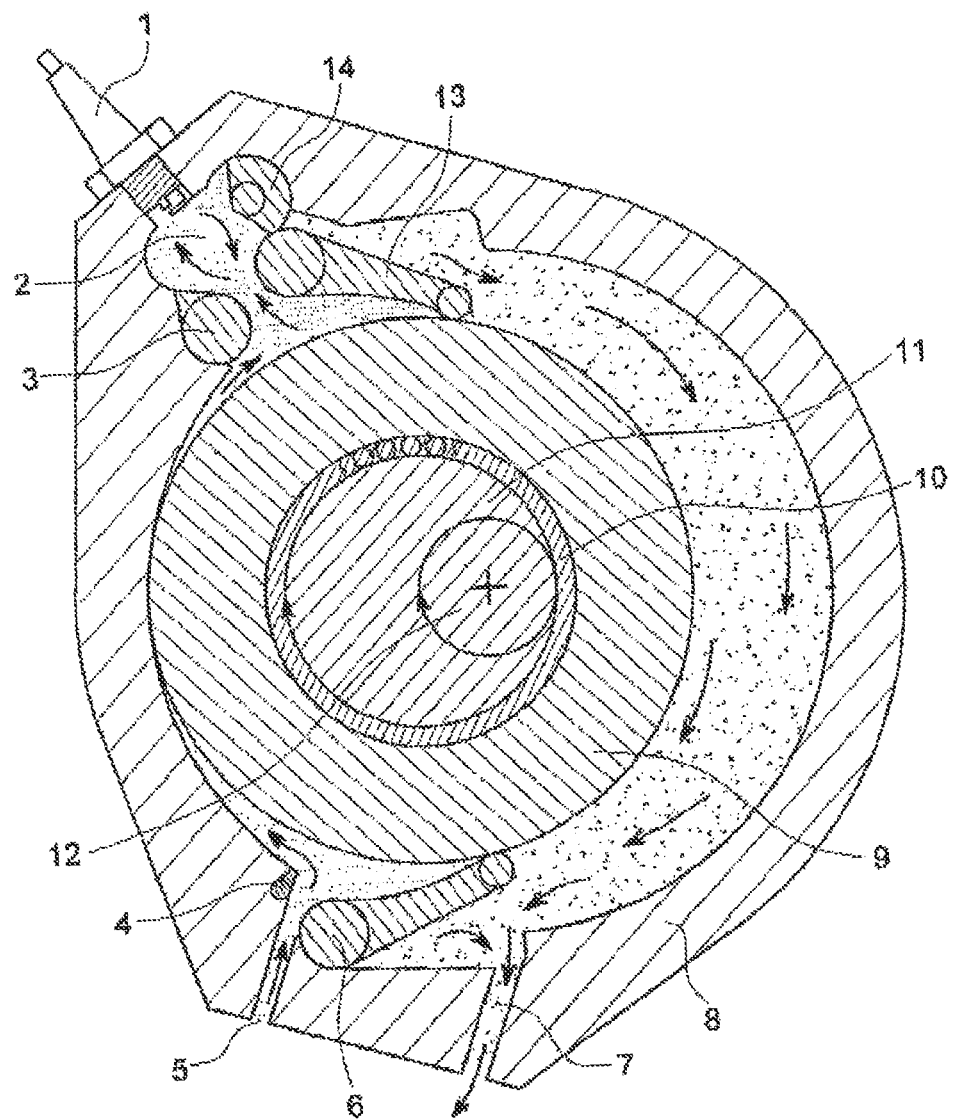
FIG. 2 depicts a section view of the rotary roller motor of FIG. 1 wherein the rotor is shifted forward 180 degrees in the combustion sequence, according to one embodiment of the invention.

FIG. 2 shows the continued rotation of the rotor along the inner wall of the engine block 8, approximately 180 degrees around the cycle. As the gas from the combustion chamber 2 expanded and urged the rotor forward, the previous cycle's expended gas exits the interior of the engine block 8 out the exhaust port 7. As the expended gas exited, the exhaust/intake barrier 6 closed downward to shut off the exhaust port 7, and then re-opened to the position depicted in FIG. 2. Simultaneously, the rolling of the rotor draws in more fresh air through the intake port 5. The advance of the rotor also compresses previously drawn-in air against the compression/power barrier 13 and the previously closed non-reversing compression barrier 3. The non-reversing compression barrier 3 is forced open by the compressed fresh air, permitting the fresh air to enter the combustion chamber 2. The compression hold barrier 14 is now closed as well after the previously combusted exhaust gas has exited the interior of the engine block 8.

Figure 3:
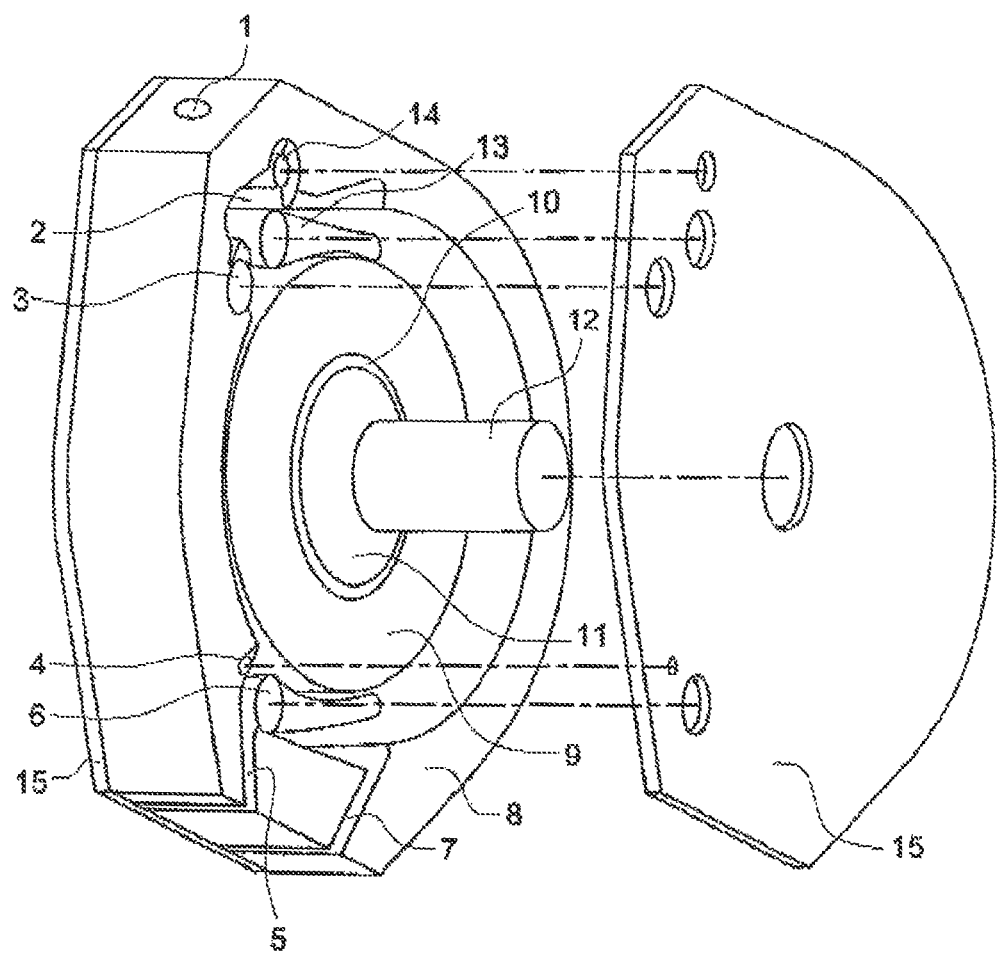
FIG. 3 depicts a perspective view of a rotary roller motor with the end cap removed, according to one embodiment of the invention.

FIG. 3 depicts the same view position of the rotor as FIG. 2, in perspective view showing the rotor shaft 12 extending outward. An end cap 15 is shown detached from the engine block 8.

Figure 4:
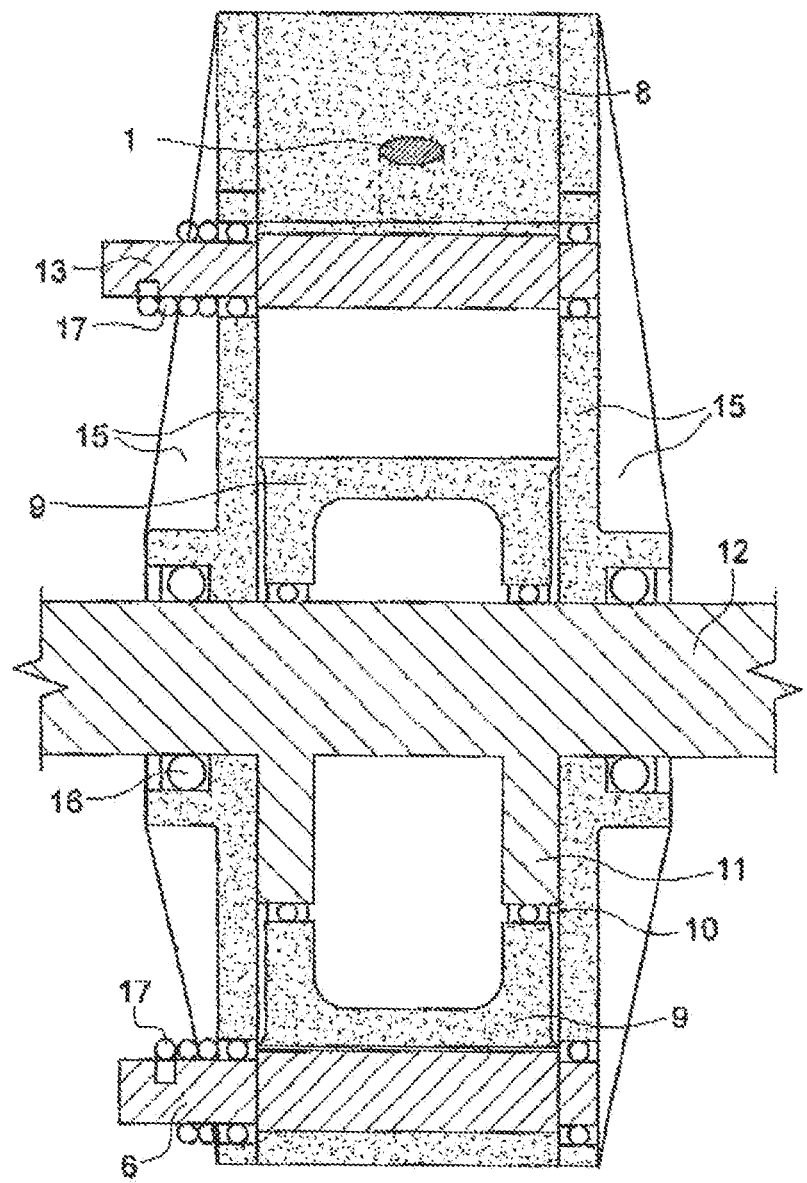
FIG. 4 depicts a lateral section view of the rotary roller motor according to one embodiment of the invention.

FIG. 4 shows a cut-away side view of the engine block 8 with the components described with reference to FIGS. 1-3. The rotor shaft 12 passes through the middle of the engine block 8. The various barriers described herein may be maintained in position by mechanical, hydraulic, pneumatic, and/or electrical means, or any combination thereof. The amount of force applied to each barrier varies based on the function of the barrier in the combustion cycle. FIG. 4 shows the compression/power barrier 13 and the exhaust/intake barrier 6 held in place by barrier spring nuts 17. The barrier spring nuts 17 provide sufficient force to urge the compression/power barrier 13 and the exhaust/intake barrier 6 against the outer rotor 9. The non-reversing compression barrier 3 may also have a barrier spring nut 17 to urge it closed, but the minimum force to overcome the urging force should be relatively low so that the compressed fresh air and can force open the non-reversing compression barrier 3 to permit the fresh air into the combustion chamber 2.

Two variations of the compression hold barrier 14 and 14A are shown in FIG. 1 and in the inset FIG. 1A. In the first variation the compression hold barrier 14 is symmetrical around the barrier shaft, such that a symmetrical pressure or force applies to both sides of the compression hold barrier 14 on either side of the barrier shaft. The benefit of this design is that the compression hold barrier can be easily opened and closed despite the pressures created during ignition and compression of the fuel and gases in the combustion chamber 2 in order to relieve overpressure. However, if the compression hold barrier 14 fails to open as designed, the combustion chamber 2 may catastrophically fail.

As an alternative the compression hold barrier 14a may be designed to be asymmetric around the barrier shaft, as shown in FIG. 1A. In this design the compression hold barrier 14a would be maintained in place by a counterforce opposing the force generated by the pressure in the combustion chamber 2. Such a counterforce may be created, for example, by using a barrier spring nut 17 such as those shown in FIG. 4. In an alternative embodiment, a counterforce may be generated from an electrical solenoid acting on the barrier shaft 12.

Figure 5:
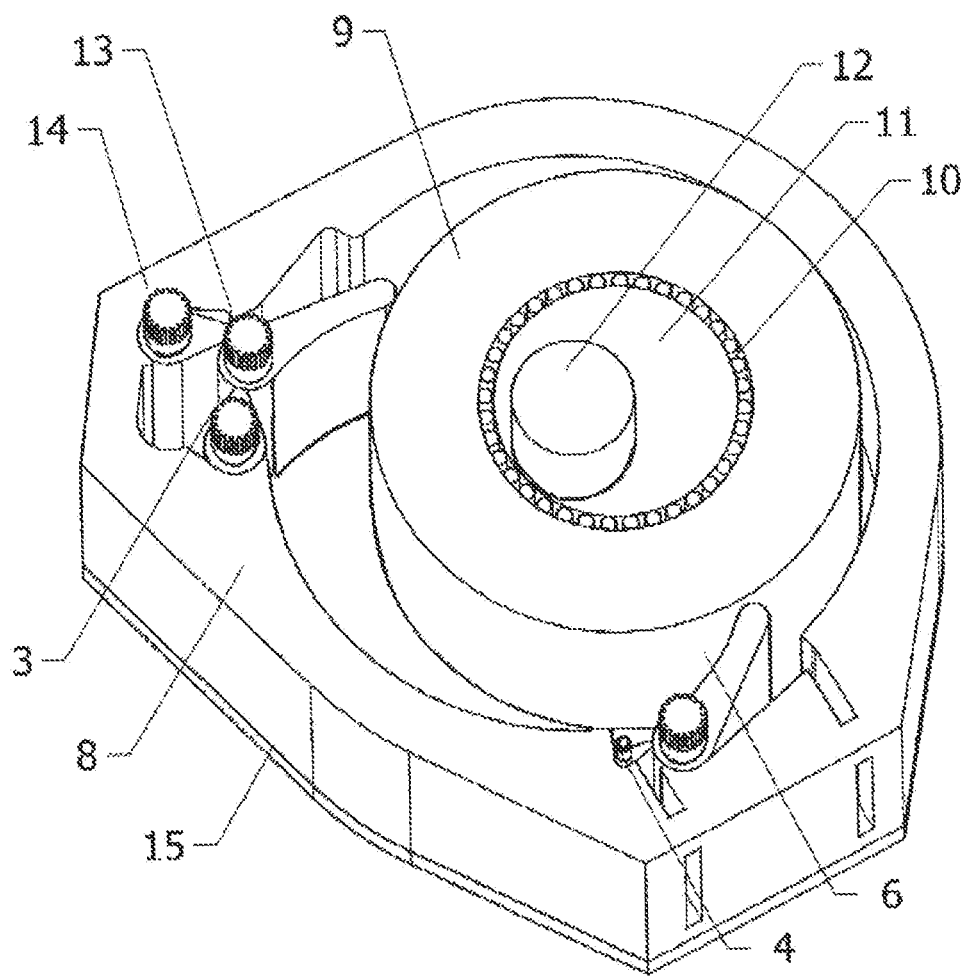
FIG. 5 depicts a perspective view of the rotary roller motor showing the parts depicted in FIG. 1, according to one embodiment of the invention.

FIG. 5 shows a three-dimensional perspective view of the rotary engine motor depicted in FIG. 1.

Figure 6:
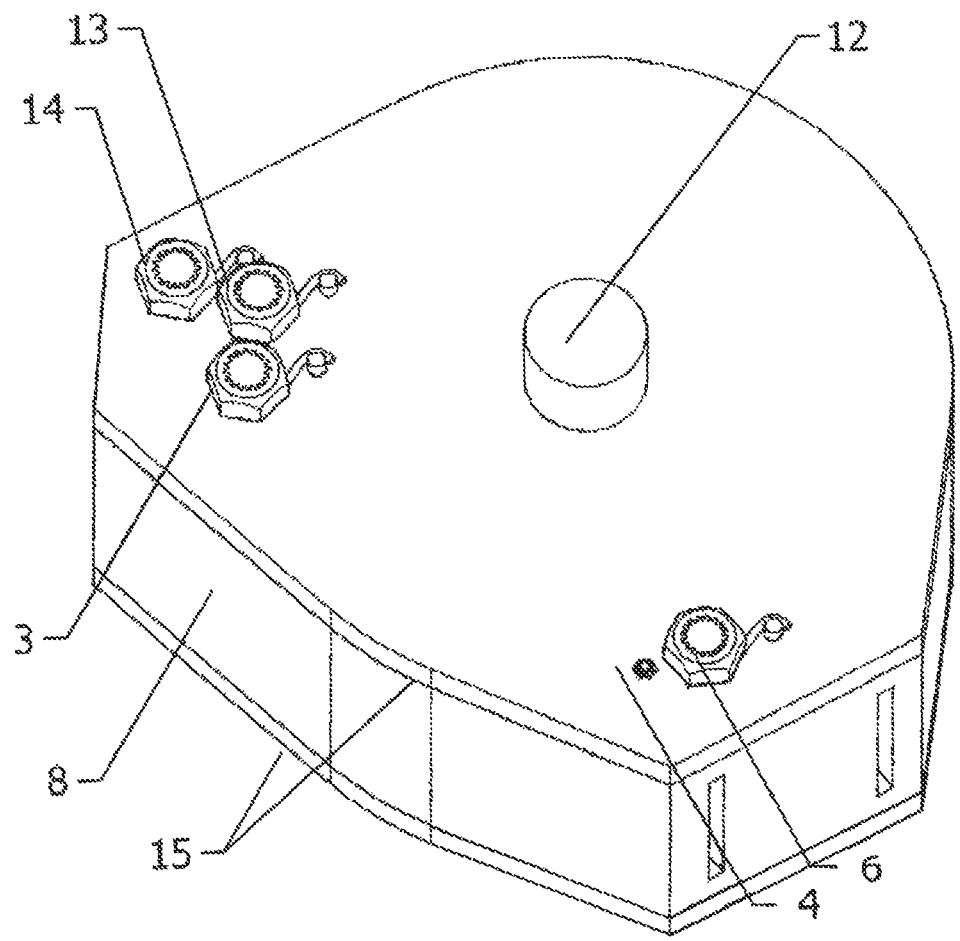
FIG. 6 depicts the same perspective view of FIG. 5 with the end cap and exterior elements in place, according to one embodiment of the invention.

FIG. 6 shows a three-dimensional perspective view with the end cap 15 applied, and showing the barrier spring nuts 17 applied to the non-reversing compression barrier 3, the compression/power barrier 13, the compression hold barrier 14, and the exhaust/intake barrier 6.

Figure 7:
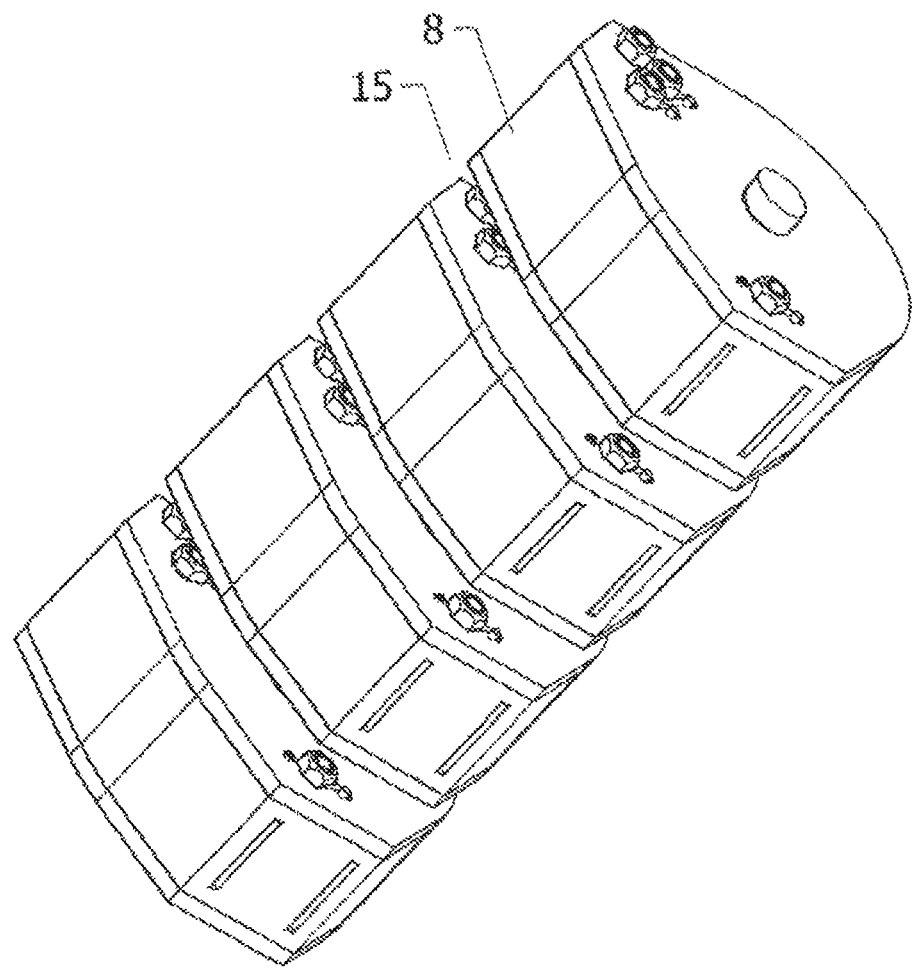
FIG. 7 depicts a perspective view of multiple rotors connected together in series, according to one embodiment of the invention.

FIG. 7 shows a three-dimensional perspective view of several rotors as described herein linked together to provide additional power.

The rotary roller motor provided herein offers significant advantages over other rotary type engines that are based on the geometry of their design. The combustion chamber can be sized to an almost unlimited number of compression ratios. The combustion chamber can also be designed to maximize specific performance goals. Additionally, the intake port, exhaust/intake barrier, and exhaust port can be located closer to the combustion chamber to change the displacement/power stroke ratio so as to accommodate better efficiency or increased performance goals. Furthermore, the rotary roller motor can be carbureted, or injected. The rotary roller motor can also use a broad range of fuels such as ethanol, gas, or diesel. Finally, the rotary roller motor can be ignited using spark plugs as shown herein, or glow plugs or high compression ignition (such as in diesel engines).

Unlike other rotary engines with complex engine blocks and internal rotor gearing, the design disclosed herein is simple and more cost efficient to manufacture and maintain, while also achieving a high horsepower to weight ratio. Additionally, the fact that the rotary roller motor performs all four major cycles (intake, compression, power, and exhaust) on each revolution means that its effective displacement per revolution is twice that of a conventional four stroke piston engine.

The invention claimed is:

1. A rotary combustion motor comprising:
  an engine block having an interior surface defining a cavity, an air intake port permitting air into the cavity, and an exhaust port releasing gas out of the cavity;
  a rotor passing through the cavity, the rotor comprising
    a rotary shaft;
    an offset circular lobe attached to the rotary shaft and housed within the interior cavity;
    an outer rotor contacting the interior surface of the engine block; and
    bearings between the outer rotor and the offset circular lobe;
  a combustion chamber having an inlet for fuel, a first opening to the cavity, and a second opening to the cavity, the first and second openings separated by a compression/power barrier urged against and maintaining contact with the outer rotor;
  a non-reversing compression barrier for selectively permitting air to pass through the first opening from the cavity to the combustion chamber;
  a compression hold barrier for selectively permitting combusted gases to pass through the second opening from the combustion chamber to the cavity; and
  an exhaust/intake barrier between the intake port and the exhaust port urged against the outer rotor,
  wherein the engine block interior surface, outer rotor, compression/power barrier and exhaust/intake barrier define a fluid pathway from the intake port through the first opening, the combustion chamber, the second opening, and the exhaust port, the fluid pathway being selectively blocked by the outer rotor rolling along the interior surface.

* * * * *